United States Patent [19]

Fuchs

[11] 4,277,397
[45] Jul. 7, 1981

[54] MONOAZO COMPOUNDS DERIVING FROM 5-AMINO-BENZIMIDAZOLE-2-ONE-6-CARBOXYLIC ACID

[75] Inventor: Otto Fuchs, Frankfurt am Main, Fed. Rep. of Germany

[73] Assignee: Hoechst Aktiengesellschaft, Frankfurt am Main, Fed. Rep. of Germany

[21] Appl. No.: 88,851

[22] Filed: Oct. 29, 1979

[30] Foreign Application Priority Data

Oct. 31, 1978 [DE] Fed. Rep. of Germany ....... 2847284

[51] Int. Cl.³ .................. C09B 29/033; C09B 29/33; D06P 1/44; D06P 1/46
[52] U.S. Cl. ................................ 260/157; 548/331; 564/200
[58] Field of Search ........................................ 260/157

[56] References Cited

U.S. PATENT DOCUMENTS

| Re. 27,575 | 2/1973 | Ribka et al. | 260/157 |
|---|---|---|---|
| 3,109,842 | 11/1963 | Schilling et al. | 260/157 |
| 3,328,384 | 6/1967 | Dietz et al. | 260/157 |
| 4,080,321 | 3/1978 | Kunstmann et al. | 260/157 |
| 4,150,019 | 4/1979 | Frolich et al. | 260/157 |
| 4,165,830 | 10/1979 | Hunger | 260/157 |
| 4,195,020 | 3/1980 | Hunger et al. | 260/157 |

FOREIGN PATENT DOCUMENTS

| 1808017 | 6/1970 | Fed. Rep. of Germany | 260/157 |
|---|---|---|---|
| 2800765 | 7/1978 | Fed. Rep. of Germany | 260/157 |
| 1001496 | 8/1965 | United Kingdom | 260/155 |

*Primary Examiner*—Floyd D. Higel
*Attorney, Agent, or Firm*—Curtis, Morris & Safford

[57] ABSTRACT

Monoazo compounds of the general formula

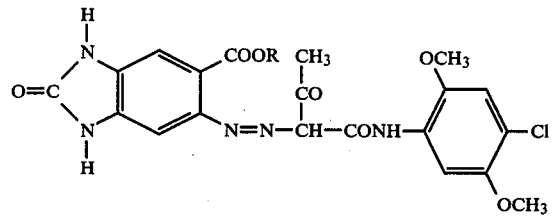

in which R is hydrogen, methyl or ethyl. The monoazo compounds are valuable pigments which are especially useful for coloring baking varnishes and plastics. They also exhibit characteristics of good fastness to light, weathering, migration, especially overvarnishing and heat stability.

4 Claims, No Drawings

MONOAZO COMPOUNDS DERIVING FROM 5-AMINO-BENZIMIDAZOLE-2-ONE-6-CARBOXYLIC ACID

The present invention relates to monoazo compounds having the formula

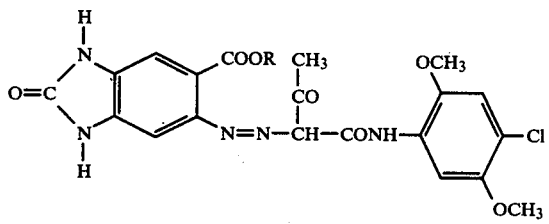

in which R is hydrogen, methyl or ethyl.

The invention further relates to a process for the manufacture of the above monoazo compounds which comprises diazotizing compounds having the formula

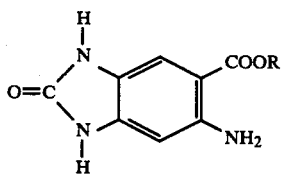

in which R is as defined above, for example in an aqueous solution or suspension, optionally with addition of solubilizers, and coupling the diazonium compound obtained onto the compound having the formula

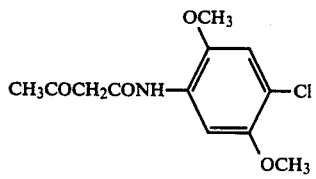

The invention relates furthermore to the use of the above monoazo compounds as pigments.

The diazo components, that is, 5-amino-benzimidazolone-6-carboxylic acid and the methyl or ethyl esters thereof, can be prepared by nitrating the benzimidazol-2-one-5-carboxylic acid or its esters, and reducing the nitro compounds obtained.

Preferred diazotization temperatures are in the range of from $-20°$ to $+30°$ C., preferably $0°$ to $20°$ C.; and the coupling temperatures are in the range of from $0°$ to $60°$ C., preferably $20°$ to $40°$ C.

In order to obtain an optimum pigment form, the coupling product is advantageously subjected to a thermal after-treatment at $60°$ to $200°$ C.

Further preferred embodiments of the invention including the following:

Coupling is preferably carried out either continuously or batchwise in the weakly acidic range, optionally with addition of coupling activators such as dispersants or organic solvents. It is advantageous to heat the suspension for a period of time after coupling is complete, optionally even at temperatures above $100°$ C., using a pressure vessel.

Alternatively, operations may be as follows: the crude pigment is first isolated and washed and subsequently, the neutral crude pigment liberated from salt is subjected to a heat treatment in an aqueous or aqueous/solvent-containing suspension at temperatures of from $60°$ to $180°$ C., preferably $90°$ to $150°$ C. A further modification of solvent treatment comprises stirring the moist press cake with a suitable solvent, distilling off the water, heating the suspension being substantially or completely free from water to a temperature above $100°$ C., subsequently removing the solvent by means of steam, and isolating the pigment. Alternatively, the pigment may be directly filtered off from the solvent suspension, and the solvent adhering to the pigment can be removed in a suitable apparatus, for example a tumbling dryer.

Solvents suitable for after-treating the crude pigments are for example toluene, xylene, chlorobenzene, o-dichlorobenzene, pyridine, picoline, methanol, ethanol, isopropanol, n-butanol, isobutanol, lower glycol-monoalkyl ethers or diglycol-monoalkyl ethers, acetone, methylethylketone, dimethyl formamide, dimethyl sulfoxide, N-methylpyrrolidone or tetramethylenesulfone.

The yellow monoazo pigments of the invention are especially suitable for pigmenting baking varnishes, where they bring about excellent fastness to light, weathering and overvarnishing, and a good thermostability even at high baking temperatures. Because of their high stability to light and their low tendency to migration, even in polyvinyl chloride containing a very large amount of plasticizer, they are furthermore suitable for dyeing polyvinyl chloride in the mass.

The following examples illustrate the invention with the percentages being by weight unless otherwise stated.

EXAMPLE 1

5.2 g of 5-amino-benzimidazol-2-one-6-carboxylic acid methyl ester are diazotized at $0°$ C. in 20 ml of 30% hydrochloric acid and 125 ml of water by adding an aqueous sodium nitrite solution. In a second vessel, 7.0 g of 2-acetoacetylamino-5-chloro-hydroquinone- dimethyl ether are suspended in 200 ml of water, dissolved by addition of 9 ml of 30% sodium hydroxide solution and 0.75 g of dimethyl coconut fatty amine oxide, and subsequently precipitated with 9 ml of glacial acetic acid. The clarified diazonium salt solution is then added dropwise within 2 hours at $20°-25°$ C. to this suspension with simultaneous addition of 5% sodium hydroxide solution in such a manner that a pH of from 5.0–5.5 is maintained during the coupling operation. Coupling being complete, the batch is heated for 30 minutes at $90°$ C., the crude pigment formed is filtered off in a hot state, and washed with hot water.

The moist filter cake is stirred with 160 ml of water and 250 g of isobutanol, and heated while being agitated for 3 hours at $125°$ C. in a pressure vessel. After cooling below the boiling point, the isobutanol is distilled off by means of steam, the pigment is filtered off, washed with hot water, dried and ground. 12.0 g of a yellow microcrystalline powder is obtained which is excellently suitable for pigmenting baking varnishes, where it is distinguished by a very good fastness to overvarnishing. It is furthermore distinguished by its excellent fastness to light and weathering. When instead of 5.2 g of 5-amino-benzimidazol-2-one-6-carboxylic acid methyl ester the equivalent amount of the ethyl ester is used, a pigment is obtained having similar properties as that described before.

EXAMPLE 2

9.6 g of 5-amino-benzimidazol-2-one-6-carboxylic acid are dissolved in 100 ml of water by adding 9.2 g of 30% sodium hydroxide solution. The filtered solution is poured while being agitated into 50 ml of 30% hydrochloric acid. The suspension is cooled to 0°-5° C., and the amine hydrochloride is diazotized by adding dropwise a sodium nitrite solution. Any excess nitrous acid present is removed by adding a small amount of amidosulfonic acid.

14.0 g of 2-acetoacetylamino-5-chloro-hydroquinone-dimethyl ether are suspended in 400 ml of water, and then dissolved by adding 18.0 ml of 30% sodium hydroxide solution and 1.5 g of dimethyl coconut fatty amine oxide. By slowly adding dropwise 36.0 ml of 50% acetic acid, the coupling component is precipitated in a finegrain form. After addition of 50 g of anhydrous sodium acetate, the filtered diazonium salt solution is added dropwise at 30°-40° C. In order tp complete the coupling, the batch is agitated for 1 hour at 60° C., subsequently the temperature is raised to 80° C., and the batch is maintained for 2 hours at this temperature. The crude pigment obtained is filtered off and washed with hot water.

The moist crude pigment is treated with 120 ml of water and 300 g of isobutanol in the same manner as described in Example 1. After filtration, washing, drying and grinding, 22.5 g of a yellow crystalline powder is obtained which is extremely suitable for pigmenting baking varnishes and plasticized PVC. The coatings produced with its use are distinguished by a very good fastness to light, weathering and overvarnishing. When processed in plasticized PVC, the pigment displays very good fastness to migration.

What is claimed is:

1. A compound of the formula

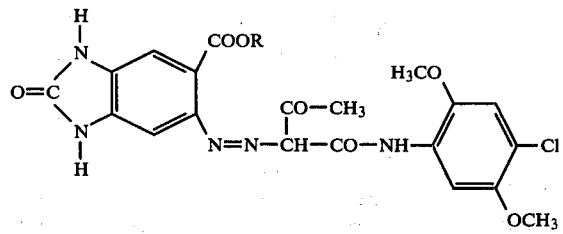

wherein R is hydrogen, methyl or ethyl.

2. The compound as claimed in claim 1, wherein R is hydrogen.

3. The compound as claimed in claim 1, wherein R is methyl.

4. The compound as claimed in claim 1, wherein R is ethyl.

* * * * *